United States Patent Office 2,963,499
Patented Dec. 6, 1960

2,963,499

ESTER SYNTHESIS

Clyde Lee Aldridge, Baton Rouge, and Neville Leverne Cull, Baker, La., assignors to Esso Research and Engineering Company, a corporation of Delaware No Drawing. Filed June 25, 1958, Ser. No. 744,324

8 Claims. (Cl. 260—410.9)

This invention relates to the use of stannous compounds in a modified oxo process for the production of esters. More particularly, this invention relates to a process for producing esters by reacting an olefin with carbon monoxide and hydrogen at elevated temperatures and pressures in the presence of a cobalt containing catalyst and a stannous compound modifier. Still more particularly, this invention relates to a process for the synthesis of esters having $2n+2$ carbon atoms from olefins having $n$ carbon atoms via a modified oxo process.

The oxo process is a well-known technique for the production of aldehydes from olefins and the general oxo conditions are applicable to the present process. Thus, the oxo process comprises reacting an olefin with carbon monoxide and hydrogen having ratios of from 1:4 to 4:1 at temperatures of about 150° to 500° F. and pressures from about 1,000 to 5,000 p.s.i.g. in the presence of a group VIII metal containing catalyst. The most preferred catalyst is cobalt which may be employed in the form of an inorganic salt, e.g. cobalt chloride, cobalt nitrate, cobalt oxide, or as an organic salt, e.g. cobalt acetate, cobalt propionate, cobalt stearate, cobalt oleate, cobalt naphthenate and the like or, if desired, metallic cobalt supported on an inert carrier may be employed. The catalyst will generally be present in an amount varying from 0.1 to 5% by weight of cobalt based on olefinic feed. If desired, the catalyst chosen may be dissolved or solubilized in the olefin feed or added separately as a slurry or paste.

To produce a $Cn+1$ alcohol, the aldehyde product is generally first treated with steam, water, acid or by other means at elevated temperature, e.g. 200–500° F., to remove the catalyst from the aldehyde product. Heat alone may be employed if desired. The decobalted aldehyde is then hydrogenated at 200–500° F. and 500–5,000 p.s.i.g. in the presence of a conventional hydrogenation catalyst such as nickel, molybdenum sulfide, tungsten sulfide or the like. Since this invention relates to the first stage of this process and the decobalting and/or hydrogenation steps may be omitted from the process depending on the product desired, no further description of the decobalting and hydrogenation techniques is believed necessary. In any event, these procedures are well known in the art and may be found in a number of patents relating to this process.

The oxo process for the production of aldehydes as described above produces in addition to an aldehyde having one more carbon atom than the starting olefin, small amounts of dimer aldehyde having two more than twice the carbon atoms of the olefin feed and relatively small amounts of higher molecular weight product commonly referred to as oxo bottoms. Recently it has been discovered that the oxo process may be modified with certain metal ions to effect a substantial increase of the dimer aldehyde product which may be converted to the dimer alcohol. Thus the recent art shows that a $C_{16}$ alcohol may be obtained in good yields from a $C_7$ olefin in a modified oxo process employing certain metal modifiers.

It has now been found that the oxo process may be modified in a different manner to effect the production of high ester yields having two more than twice the number of carbon atoms in the olefin in the first stage of the oxo process described above. It has been found that stannous compounds when added to the oxo reaction as a co-catalyst or modifier in an amount of from 0.03 to 3 wt. percent on olefin calculated as stannous ion under the otherwise conventional oxo conditions noted above, effect a surprisingly high yield of this dimer ester product. The exact mechanism involved is not known; however, it has been established by data which will be presented subsequently that this effect is peculiar to the stannous ion. By the term "stannous compound" it is meant to include organic and inorganic compounds containing tin in its stannous valence state. The anion portion of the compound is not critical to the invention as long as it does not inhibit the reaction or inject undesirable impurities into the product. The following compounds are typical of those which may be employed: Stannous bromide, chloride, citrate, hydroxide, iodide, oxalate, oxide, tannate, oleate, stearate, naphthenate, tartrate, acetyl acetonate and acetate. Other metals and even stannic compounds do not substantially increase the ester yields.

As noted previously, the improvement of this invention relates to the use of a stannous compound in an otherwise conventional oxonation process. Accordingly, any olefinic compound which has previously been used as an oxo feed is suitable in the present modification. Such olefins include the straight and branched chain $C_2$–$C_{20}$ compounds, e.g. ethylene, propylene, butylenes, hexene, heptene, octene, nonene and so on up to about $C_{20}$ which is a practical upper limit. Cyclo-olefinic compounds such as cyclohexene, cycloheptene and the like are also known to undergo the oxo reaction as well as substituted olefinic compounds including unsaturated fatty acids and their esters, unsaturated alcohols, unsaturated aldehydes and vinyl ethers.

It is to be understood, however, that as in the conventional oxo reaction, substantial amounts of aldehyde product having one more carbon atom than the olefin are formed together with small amounts of dimer aldehyde and higher molecular weight bottoms. If desired, the ester product may be fractionated from the crude aldehyde mixture; however, this has certain disadvantages due to the reactivity of the aldehydes with any alcohol and other contaminants present in the crude product. When a crude oxo aldehyde product mixture is conventionally fractionated or distilled even under reduced pressures, side reactions inevitably occur, resulting in loss of product and decreased purity.

One satisfactory technique for the recovery of the ester product without substantial loss of monomer product is to proceed with the conventional oxo process, i.e. decobalting and hydrogenation, to produce a mixture comprising essentially the monomer oxo alcohol $(n+1)$, the dimer alcohol product $(2n+2)$ and the dimer ester product $(2n+2)$. The ester is separated from the monomer alcohol and dimer alcohol by fractionation preferably under reduced pressures. It is emphasized, however, that this invention does not relate to any specific means for the separation of the various oxygenated compounds in the product mixture.

The exact isomeric structure of the esters produced by this reaction is not known; however, in general they will have the following structural formula:

RCOOR' wherein both R's are alkyl radicals and wherein R contains one less carbon atom than R'. The lower esters having a total of less than about 12 carbon atoms are useful as solvents and the higher molecular weight esters; those having a total of 12 or more carbon atoms are especially adapted for use as plasticizers and synthetic lubricants with or without additional components. Other obvious uses for these esters will be apparent to those skilled in the art.

To point out the invention with more particularity, reference is now had to the examples which follow:

Example 1

700 grams of a $C_7$ UOP olefin was added to a three liter reactor with 20.7 grams (.033 mole per liter) of cobalt oleate and 15.0 grams (.022 mole per liter) of stannous oleate. The reactor was pressured with a synthesis gas mixture of $H_2$ and CO with a ratio of 1.3 to 1 to 3,000 p.s.i.g. and the temperature was raised to 350° F. for a period of 6 hours. After depressuring the reactor, the cobalt compounds, i.e. carbonyls, were decomposed and removed in a conventional manner at elevated temperatures of 350° F. with 700 p.s.i.g. of hydrogen pressure for two hours. The product was fractionated to produce the several fractions listed below and each was analyzed with the following results:

| Fraction | B.P. | Wt. percent | Mole percent selectivity | OH No. | Acid No. | Sap. No. | CO No. |
|---|---|---|---|---|---|---|---|
| Water | | 1.0 | | | | | |
| Hydrocarbon | 77–121° C. @ 760 mm | 14.8 | | | | | |
| $C_8$ Aldehyde + $C_8$ Alcohol | 54–99° C. @ 20 mm | 36.0 | 43.8 | 347.7 | 0.4 | 5.0 | 83.1 |
| Intermediate | 99–154° C. @ 20 mm | 3.4 | 4.1 | | | | |
| $C_{16}$ Easter (Octyl octanoate) | 154–171° C. @ 20 mm | 19.3 | 23.8 | 66.9 | 8.3 | 133.3 | 9.4 |
| $C_{16}$ Alcohol | 171–182° C. @ 20 mm | 1.0 | 1.3 | 157.1 | 17.3 | | |
| Bottoms | | 24.5 | 27. | | | | |
| Total Crude Product | | | | | | 53.9 | |

It will be noted that the ester product amounted to over 50% of the monomer oxo product. After purification to remove alcohol, acid and aldehyde, the $C_{16}$ ester had the following properties: B.P. 158–170° C. (19 mm.), $d_{25}^{25}$ 0.858, $n_D^{25}$ 1.4374. The saponification products of the ester were identified as $C_8$ acid and $C_8$ alcohol.

Acid fraction:
 Neut. Eq.=147.7 (theoretical for $C_8$ acid 144.2)

Alcohol fraction:
 B.P. 183–203° C. (B.P. of $C_8$ oxo alcohol 184–191° C.)
 $n_D^{25}$ 1.4303 ($n_D^{25}$ of authentic oxo alcohol 1.4292)
 Hydroxyl No. 391.4 (theoretical 431)

Example 2

For the purpose of comparing this stannous compound modifier with the oxo reaction without the modifier, a similar run was carried out employing like amounts of cobalt catalyst under substantially identical temperature, pressure and time conditions. In this run, small amounts of $C_{16}$ alcohol were obtained with substantially no ester product. The saponification number of the $C_{16}$ cut in this example was 4.8 as compared to Example 1 wherein the saponification number of the $C_{16}$ ester produced was 133.3.

Example 3

A run similar to Example 1 was made except the crude decobalted oxo product was hydrogenated for 6 hours at 350° F. and 3,000 p.s.i.g. of hydrogen over nickel catalyst. The crude product analyses were obtained on the following fractions:

| Fraction | B.P., °C. | Wt. percent | OH No. | Acid No. | Sap. No. | Co No. |
|---|---|---|---|---|---|---|
| Water | | 1.0 | | | | |
| Hydrocarbon | 77–121 | 18.0 | | | | |
| $C_8$ Alcohol | 79–99 | 20.5 | 427.4 | 0.1 | 2.2 | 3.3 |
| Intermediate | 99–154 | 2.5 | | | | |
| $C_{16}$ Ester | 154–171 | 13.0 | 58.4 | 0.1 | 150.7 | 2.1 |
| $C_{16}$ Alcohol | 171–182 | 6.0 | 147.6 | 5.0 | 87.1 | 4.5 |
| Bottoms | | 24.0 | | | | |

A crude distillation column with few plates was employed which did not sharply separate the ester from the alcohol. As a result some of the ester was present in the alcohol fraction and some of the alcohol in the ester fraction.

Example 4

For the purpose of comparing the stannic ion with the stannous modifiers of this invention, a run was carried out under conditions similar to those in Example 3 with exception that equivalent amounts of stannic oleate were employed in place of stannous oleate. The crude product showed a significantly lower yield of ester. The saponification number of the total product was 26.2 as compared to a saponification number of 53.9 for Example 1.

Example 5

Three blank oxo runs were made under conditions similar to Example 3. No metal additive was used other than the cobalt oleate. Product distribution was as follows:

| Fraction | Wt. percent | | |
|---|---|---|---|
| Water | 1.0 | 1.0 | 1.0 |
| Hydrocarbon | 24.0 | 20.1 | 17.0 |
| $C_8$ Alcohol | 62.2 | 64.5 | 62.0 |
| Intermediate | 2.5 | 2.5 | 5.0 |
| $C_{16}$ Ester | 2.0 | 2.5 | 3.0 |
| $C_{16}$ Alcohol | 3.0 | 3.0 | 2.0 |
| Bottoms | 5.5 | 7.0 | 9.0 |

Example 6

1000 grams of propylene is reacted with carbon monoxide and hydrogen at a ratio of 1:1 at a temperature of 270° F. and a pressure of 3,500 p.s.i.g. in the presence of 15 grams of cobalt naphthenate and 8 grams of stannous oxide for a period of 4 hours to produce good yields of $C_8$ dimer ester and butyraldehyde.

Example 7

1000 grams of decene-1 is reacted with 35 grams of cobalt stearate and 10 grams of stannous chloride at 3,500 p.s.i.g. and 420° F. for a period of 8 hours to produce a mixture of $C_{11}$ oxo aldehyde and $C_{22}$ ester which is especially amenable for use as a plasticizer.

What is claimed is:

1. A process for the production of esters which comprises reacting an olefinic compound having $n$ carbon atoms with hydrogen and carbon monoxide at elevated temperatures and pressures in contact with an oxo catalyst and an ionic stannous compound to produce an ester containing $2n+2$ carbon atoms.

2. A process for the production of esters which comprises reacting an olefin having $n$ carbon atoms with carbon monoxide and hydrogen at elevated temperatures and pressures in contact with a cobalt containing catalyst and from about 0.03 to 3 wt. percent of an ionic stannous compound modifier based on said olefin and calculated as stannous ion to produce an ester containing $2n+2$ carbon atoms.

3. A process for the production of esters which comprises reacting an olefin with carbon monoxide and hydrogen under carbonylation conditions in the presence of a cobalt catalyst and from about 0.03 to 3 wt. percent of an ionic stannous compound modifier based on said olefin and calculated as stannous ion to produce a mixture containing monomer aldehydes containing one more carbon atom than said olefin and a dimer ester product containing 2 more than twice the number of carbon atoms in said olefin, separating and recovering said ester from said mixture.

4. A process in accordance with claim 3 wherein said aldehyde ester mixture is first decobalted and then hydrogenated to produce a mixture containing monomer alcohols and dimer esters and said mixture is then fractionated to recover separately monomer alcohol and dimer ester product.

5. A process for the production of esters which comprises reacting an olefin having $n$ carbon atoms, $n$ being 2 to 20, with carbon monoxide and hydrogen at temperatures of 150 to 500° F. and pressures of 1000 to 5000 p.s.i.g. in contact with a cobalt-containing catalyst and from about 0.03 to 3 wt. percent of an ionic stannous compound modifier based on said olefin and calculated as stannous ion, said stannous ion being the cation in said stannous compound, to produce an ester containing $2n+2$ carbon atoms.

6. A process according to claim 5 in which the stannous compound is an organic compound.

7. A process according to claim 5 in which the stannous compound is an inorganic compound.

8. A process according to claim 5 in which the stannous compound is stannous oleate.

References Cited in the file of this patent

UNITED STATES PATENTS

| | | |
|---|---|---|
| 2,070,131 | Joshua | Feb. 9, 1937 |
| 2,733,252 | Thompson | Jan. 31, 1956 |
| 2,763,555 | Norris et al. | Sept. 18, 1956 |
| 2,796,441 | Mertzweiller | June 18, 1957 |
| 2,844,612 | Rottig | July 22, 1958 |